(12) United States Patent
Guo et al.

(10) Patent No.: US 9,475,948 B2
(45) Date of Patent: Oct. 25, 2016

(54) INK JET INK WITH HIGH STRUCTURE PIGMENT PARTICLES

(75) Inventors: Dennis Z. Guo, San Diego, CA (US); Stephen Horvath, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 486 days.

(21) Appl. No.: 13/825,686

(22) PCT Filed: Sep. 23, 2010

(86) PCT No.: PCT/US2010/050058
§ 371 (c)(1),
(2), (4) Date: Mar. 22, 2013

(87) PCT Pub. No.: WO2012/039716
PCT Pub. Date: Mar. 29, 2012

(65) Prior Publication Data
US 2013/0194363 A1    Aug. 1, 2013

(51) Int. Cl.
*B41J 2/21* (2006.01)
*C09D 11/30* (2014.01)
*C09D 7/12* (2006.01)

(52) U.S. Cl.
CPC .............. *C09D 11/30* (2013.01); *B41J 2/2107* (2013.01); *C09D 7/1266* (2013.01); *C09D 7/1275* (2013.01); *Y10T 29/49401* (2015.01)

(58) Field of Classification Search
CPC .............. B41J 2/01; B41J 2/05; B41J 2/175; B41J 2/17503; B41J 2/2107; C09D 11/322; C09D 11/324; C09D 11/326
USPC ....... 347/20, 56, 85, 86, 95–100; 106/31.13, 106/31.6, 31.65
See application file for complete search history.

(56) References Cited

U.S. PATENT DOCUMENTS

| 6,039,438 A | 3/2000 | Beerling |
| 6,245,832 B1 | 6/2001 | Suzuki et al. |
| 6,610,129 B1 | 8/2003 | Sader et al. |
| 7,348,368 B2 | 3/2008 | Kakiuchi et al. |
| 7,414,082 B2 | 8/2008 | Hirasa et al. |
| 2004/0217997 A1* | 11/2004 | Mackenzie et al. ............ 347/12 |
| 2004/0229976 A1* | 11/2004 | Kakiuchi et al. ............. 523/160 |
| 2005/0012791 A1* | 1/2005 | Anderson et al. .............. 347/85 |
| 2007/0043146 A1* | 2/2007 | House ................... C09D 11/324 523/160 |
| 2009/0170986 A1 | 7/2009 | Brust et al. |
| 2010/0010148 A1* | 1/2010 | Imai et al. ..................... 524/522 |
| 2010/0201769 A1* | 8/2010 | Kakikawa et al. ........... 347/100 |

FOREIGN PATENT DOCUMENTS

| CN | 101486859 | 7/2009 |
| JP | 7053860 | 2/1995 |
| JP | 2002097390 | 4/2002 |
| JP | 2004285344 | 10/2004 |
| JP | 20062822760 | 10/2006 |
| WO | 2009143433 | 11/2009 |

OTHER PUBLICATIONS

Aden et al., The Third-Generation HP Thermal InkJet Printhead, Hewlett-Packard Journal, Feb. 1994m oo, 41-45.

* cited by examiner

*Primary Examiner* — Manish S Shah
(74) *Attorney, Agent, or Firm* — Thorpe, North & Western L.L.P.

(57) ABSTRACT

An ink jet ink with high structure pigment particles can include a liquid vehicle, high structure pigment particles dispersed in the liquid vehicle at from about 0.2 wt % to about 5.0 wt %, and a polyurethane binder present in the liquid vehicle at from about 0.2 wt % to about 5.0 wt %. The high structure pigment particles can have polymer dispersant adsorbed onto a surface thereof, a DBP absorption value at a minimum of about 75 ml/100 g, and a surface area of about 200 $m^2$/g to about 2000 $m^2$/g.

18 Claims, 2 Drawing Sheets

MAG = 20.00 KX     EHT = 5.00 kV     Signal A = InLens
1μm     WD = 5 mm     Photo No. = 367

INK JET INK WITH HIGH STRUCTURE PIGMENT PARTICLES

BACKGROUND

An ink jet printing system typically includes a printhead and an ink supply which supplies liquid ink to the printhead. The printhead ejects ink drops through a plurality of nozzles and toward a print medium, so as to print an image onto the print medium. In thermal ink jet printing, heat is used to accomplish ejection of the ink. More specifically, the printhead ejects an ink drop through a nozzle by rapidly heating a small volume of ink in a chamber adjacent to the nozzle. The heating causes the ink to vaporize and be ejected from the nozzles. Heating is typically done using small electric heating elements, such as thin film resistor elements, also referred to as heating resistors. Each single printing element, or drop generator, in a printhead therefore typically includes a nozzle, a vaporization chamber, and a heating resistor.

Heating resistors can be subjected to severe mechanical stresses during thermal ink jet printing. These stresses arise in part from thermal cycling of resistors, and also from the cavitation pressures produced during the cooling phase of the ejection cycle, when the bubble of vaporized ink collapses onto the resistor surface. Such stresses can produce wear on the resistors in the form of etching, cracking, or delamination, and eventual failure of the resistor. These phenomena can be of particular significance in high ink usage printing applications, such as inkjet web press printing, retail photo printing and large format printing. Improving resistor life can be valuable to users, as ink pen replacement can be a large factor in operating costs for such applications. Printing approaches that provide increased resistor life with ink jet inks can increase the practical applications of ink jet printing.

DETAILED DESCRIPTION

Figure 1:
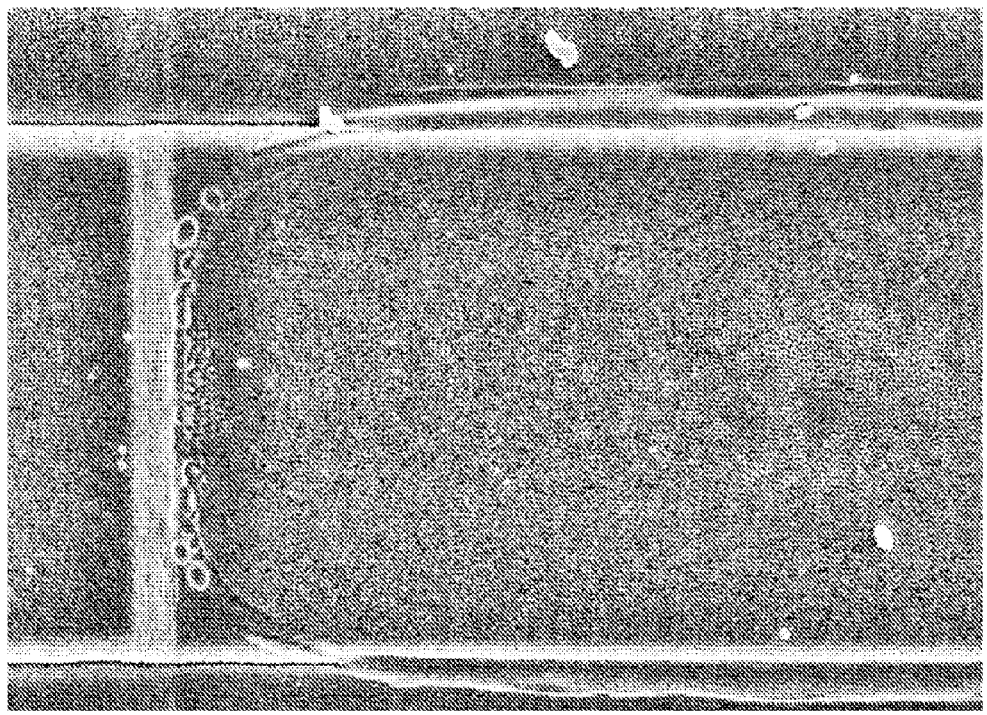
FIG. 1 is a scanning electron micrograph of the surface of an ink jet heating resistor showing etching resulting from repeated ejection of a typical pigment ink.

Reference will now be made to the exemplary embodiments illustrated, and specific language will be used herein to describe the same. Features and advantages of the invention will be apparent from the detailed description which follows, taken in conjunction with the accompanying drawings, which together illustrate, by way of example, features of the invention.

It is noted that, as used in this specification and the appended claims, the singular forms "a," "an," and "the" include plural referents unless the context clearly dictates otherwise.

As used herein, "liquid vehicle," "vehicle," or "liquid medium" refers to the fluid in which the colorant of the present disclosure can be dispersed or dissolved to form an ink jet ink. Liquid vehicles are widely available, and a wide variety of ink vehicles may be used in accordance with embodiments of the present disclosure. Such ink vehicles may include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc. Additionally, the term "aqueous liquid vehicle" or "aqueous vehicle" refers to a liquid vehicle including water as a solvent. This refers in particular to liquid vehicles that are predominantly water, that is, in which water is present in an amount greater than any other individual liquid component.

Use of the prefix "poly" herein as a modifier indicates the presence of two or more of the thing modified. For example, "polyols" refers to molecules having two or more hydroxyl groups, i.e. diols, triols, tetrols, and so on.

Embodiments are described herein which include "high structure pigment particles," or "high structure carbon black pigments" are generally those in which the aggregates exhibit more branching and irregularity than low structure carbon black pigments. Typically, carbon black pigments comprise of aggregates of primary particles. The surface properties of pigment and other powdery solids can be quantified by a number of methods. The physical properties associated with high particle structure can be observed by direct means such as high-resolution microscopy, e.g. electron microscopy. Other more quantitative means exist in the art for assessing particle structure, such as surface absorption test methods (e.g. oil absorption or DBP absorption). In one aspect, the high structure pigment particles of the embodiments herein can be recognizable as such in that they exhibit high DBP absorption values. In one embodiment, the high structure pigment particles included in the ink exhibit DBP absorption values over 75 ml per 100 g of pigment.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It is noted that methods of improving resistor life in ink jet printing applications as described herein often involve utilization of ink compositions comprising high structure carbon black pigment and a polymeric binder, particularly a polyurethane binder. It should also be noted that elements described herein with respect to the subject matter of particular embodiments are also incorporated in the description of related embodiments that include that subject matter. For example, certain features and elements will be described herein in reference to ink jet inks. These features and elements are also applicable to methods described herein of printing using such inks and also in printing apparatus and systems that utilize such inks.

With this in mind, the present disclosure is drawn to ink jet ink compositions, printer devices, and methods of assembly that improve printer resister life over many other inks known in the art. Thus, an ink jet ink with high structure pigment particles can include a liquid vehicle, high structure pigment particles dispersed in the liquid vehicle at from about 0.2 wt % to about 5.0 wt %, and a polyurethane binder present in the liquid vehicle at from about 0.2 wt % to about 5.0 wt %. The high structure pigment particles can have polymer dispersant adsorbed onto a surface thereof, a DBP absorption value at a minimum of about 75 ml/100 g, and a surface area of about 200 $m^2/g$ to about 2000 $m^2/g$. In one specific embodiment, a reservoir containing the ink jet ink is assembled in a device with a nozzle in fluid communication with the reservoir. A heating resistor for heating the ink jet ink is also present so as to eject the ink jet ink from the nozzle.

As mentioned herein, these ink jet inks, devices, and methods are particularly useful in increasing the life of thermal resistors. For example, during the expansion and then contraction of an ink bubble in an ink jet drop generator, the component materials in the ink impact the resistor surface with tremendous force. While heating resistors typically include tough materials, e.g. tantalum oxide, the repeated impact forces over hundreds of millions of ejection cycles can eventually damage the resistor surface to the point of failure. As seen in the micrograph of a resistor shown in FIG. 1, this damage can take the form of etching of the resistor surface. Some printing applications involve higher volumes of ink, making resistor failure a significant concern. These include large format printing, such as wide swath personal or commercial printing, web press printing, as well as printing that involves a large volume of ink relative to print surface area, such as retail photo printing.

A measure of resistor life (and therefore pen life) is the number of drops of ink that can be ejected from the print nozzle before the heating resistor fails. Once failure occurs, restoring full printing function typically involves replacing the failed pen. In high ink usage applications, resistor failure after even tens of millions of drops can involve frequent pen replacement and a resultant decrease in productivity. Typically, ink jet print heads can include up to more than 10,000 nozzles per color depending on the print format, e.g., desktop printing, photo printing, web press printing, etc. Large format printing apparatus are configured to provide a wide print swath for effective printing on large media. Web press printers, for example, can include multiple print engines with redundant print head arrays for each ink color. Such a printing system can therefore include over a hundred print heads and hundreds of thousands of individual print nozzles. To achieve high quality and cost-effective performance in high volume printing, very long pen life can be beneficial. To illustrate by example, an ink jet pen prepared with an ink in accordance with the technology disclosed herein can exhibit a greatly enhanced life, e.g. well over 500 million drops per nozzle (MDPN).

Inks with pigment colorant dispersions can be used in ink jet printing to produce high-quality images having desirable features, such as good resistance to water, highlighter, and light fade. Pigment particles in ink jet inks are commonly dispersed in a liquid vehicle, and may further be surface-modified to improve their dispersability in such vehicles. A number of approaches exist for surface modification of pigment particles, including chemical modification such as substitution of surface groups to improve stability, or attachment of polymer dispersants to the particle surface. Relatively simple and cost-effective processes have been developed to physically adsorb polymer dispersants to the surface of pigment particles. Such availability has made such pigments potentially attractive for use in ink jet applications, particularly high ink usage applications. However, it has been found that polymer dispersed carbon black pigments made in this way can be associated with lowered resistor life.

The embodiments herein reflect the unexpected finding that a particular combination of carbon black pigment structure and binder material can counteract this effect and greatly extend resistor life. In one embodiment, a pigment-based ink composition for ink jet printing that provides long resistor life can comprise high structure pigment particles dispersed in a liquid vehicle, and also include a polyurethane binder.

In one embodiment, high structure carbon black pigment particles that can be used for use in the ink jet ink composition include furnace black and gas black. In a particular example, the high structure pigment particles used for a black ink can be furnace black.

A property of the pigments used in the present embodiments is that the pigments comprise high structure particles. Carbon black pigment particles, for example, are typically secondary structures comprising clusters of very small primary particles. For example, the primary particle size of pigments used in the inks described herein can range from about 10 to 40 nm, or more particularly from about 15-20 nm, and can produce aggregates having a specific surface area from about 200 to about 350 $m^2/g$.

High structure particles typically include secondary particle structures arising from complex aggregations of primary particles. The high structure particles can exhibit more complex surface characteristics than is typical for low structure particles. In one aspect, higher structure particles exhibit greater irregularity and deviation from sphericity than lower structure particles. In another aspect, a high structure particle exhibits a greater internal void volume than a low structure particle of equivalent mass. The physical properties associated with high particle structure can be observed by direct means such as high-resolution microscopy, e.g. electron microscopy. Other more quantitative means exist in the art for assessing particle structure, such as surface absorption test methods (e.g. oil absorption or DBP absorption). In one aspect, the high structure pigment particles of the embodiments herein can be recognizable as such in that they exhibit high DBP absorption values. In one embodiment, the high structure pigment particles included in the ink exhibit DBP absorption values over 75 ml per 100 g of pigment. In a more particular embodiment, the high structure pigment particles exhibit a DBP absorption value of from about 75 ml/100 g to about 300 ml/100 g. In a still more particular embodiment, the high structure pigment particles exhibit a DBP absorption value of from about 85 ml/100 g to about 300 ml/100 g.

It is noted that a high DBP value is a tool to determine whether a pigment mass may be a high structure pigment, but is not always entirely dispositive alone. Verification can be carried out using observation techniques and/or surface absorption test methods in conjunction with DBP testing.

The high structure pigment particles used may have an average particle size that is suited to the printing application or printing apparatus. In certain applications, it can be advantageous to keep particle size within certain limits, so that ink properties related to jettability (e.g. viscosity, density, dispersion stability) can be properly managed. For example, the particle size can be sufficiently small so as to permit free flow of the ink through an ink printing device, and particularly to permit ejection from a print nozzle. In another example, the particle size is such that the pigment dispersion is stable, without settling of the pigment to a degree that degrades jettability. It will be understood therefore, that the average particle size of high structure particles used in the present ink can be selected to provide desired performance characteristics, e.g. decap, decel, resistance to kogation, etc., when printed with a particular printing system, as well as desired print quality and durability on particular media. It has been found that high structure particles having a larger size can contribute to increased resistor life. In one aspect of the embodiments herein, therefore, the high structure pigment particles can comprise relatively large particles. In a particular embodiment, the high structure black pigment particles exhibit an average secondary particle size of from about 50 nm to about 500 nm. In a more particular embodiment, the secondary average particle size of the pigment can be from about 75 nm to about 350 nm.

Inks with high structure black pigment dispersion may further comprise one or more other colorants in certain applications. For example in photo applications, black inks can contain a high structure black pigment dispersion and one or more colorants (e.g. non-black pigment or dye) to balance neutrality. Similarly, the amount of pigment included in the ink jet ink can also be selected in accordance with desired physical properties of the ink, as well as the application properties. For example in photo applications, light gray black inks may include significantly less pigment than a darker black ink (e.g. medium gray and regular photo black). In one embodiment, the high structure black pigment can be present in an amount from about 0.2 wt % to about 5.0 wt %. In a more particular embodiment, the black pigment is present from about 0.5 wt % to about 2.0 wt %. In another embodiment, the black pigment is present from about 1.5 wt % to about 4.5 wt %.

The high structure black pigment can include additional material to provide increased dispersability of the particles in the liquid vehicle. Dispersant materials can generally be attached to pigment particle surfaces by way of a chemical attachment such as involving covalent bonding between the dispersant and the pigment, or alternatively, the dispersant can be adsorbed onto the particle surface. Physical adsorption can provide a more simple way to disperse particles and thereby be a useful option in high ink usage applications. In a particular embodiment, the high structure black pigment particles are dispersed by polymer dispersant by way of physical absorption. The dispersant can be selected from classes of materials useful for that purpose. In particular, polymer dispersants can be used, including copolymers such as styrene, methacrylic acid, acrylic acid, substituted acrylic acid, maleic anhydride, and the like. In a particular embodiment, the ink jet ink comprises high structure pigment particles dispersed with styrene acrylic adsorbed on the surface of the particles. The polymer dispersant can be structured as a block copolymer, in which at least one block has affinity for the pigment surface and another block provides colloidal stability.

The ink jet ink can also comprise a polyurethane binder. A combination of high structure carbon black and polyurethane binder provides increased pen resistor life of the black ink. The polyurethane binder also provides a printed image with particular durability characteristics, such as increased, waterfastness, scratch resistance, resistance to highlighter smear, and the like. A polyurethane binder may be chosen to form a film or other supportive structure in the printed image when printed on a variety of substrates under certain conditions. For example, a polyurethane binder can have a glass transition temperature so as to form a film at the printing temperature or upon exposure to appropriate heat and/or pressure applied to the image.

In accordance with an embodiment of the present disclosure, the polyurethane can be selected in conjunction with a high structure carbon black pigment in an ink jet ink formulation so as to provide increased resistor life for printing with the black ink jet ink. Polyurethane polymers as discussed herein are polymers in which the polymer backbone contains urethane linkages derived from the reaction of an isocyanate group (e.g. from a polyisocyanate) with a hydroxyl group (e.g. from a polyol). A polyurethane may also include other monomers to contribute other properties. For example, acidic monomers (e.g. mono- or poly-carboxylic acids) can be included to impart acidity to the polymer. In another example, monomers having readily ionizable groups can be included to impart added ionic stability. Furthermore, amine may be used during synthesis to quench polymerization of the urethane, thereby causing the inclusion of one or more urea linkages. As such, polyurethanes in accordance with the embodiments herein can also include other linkages in conjunction with the incorporation of other monomer types.

Features of the polyurethane binder are the polyol and the polyisocyanate. Polyurethanes contemplated for use in the present embodiments include polyols including but not limited to hydrocarbon polyols, polyacrylate polyols, polyether polyols, and polyester polyols. In a particular embodiment, the polyurethane binder includes a polyether glycol, such as polypropylene glycol, polytetramethylene glycol, polyethylene glycol, poly(ethylene oxide) polymers; poly(propylene oxide) polymers; poly(tetramethylene oxide) polymers, and mixtures thereof. In a specific example, the polyurethane binder includes polytetramethylene glycol.

The polyisocyanates that can be included in the polyurethane binder include methylene diphenyl diisocyanate, hexamethylene diisocyanate, p-tetramethyl xylene diisocyanate, m-tetramethyl xylene diisocyanate, bitolylene diisocyanate, toluene diisocyanate, methylene-bis(4-cyclohexyl)diisocyanate, p-phenylene diisocyanate, isophorone diisocyanate, 1,5-naphthalene diisocyanate, and mixtures thereof. In a particular embodiment, the polyisocyanate in the polyurethane binder is isophorone diisocyanate.

Acidic monomers can be included in the polyurethane to increase acidity and improve stability of the polymer in the ink vehicle. Accordingly, the polyurethane can further include monomers having acid groups, including hydroxy functional aliphatic carboxylic acids, such as dimethylol propionic acid.

In a particular embodiment, the polyurethane binder is present in the ink at about 0.2 wt % to about 5.0 wt %. In a more particular embodiment, the polyurethane binder is present at from about 0.5 wt % to about 5.0 wt %.

In an embodiment of the present disclosure, the ink jet ink includes an aqueous liquid vehicle comprising water as well as any solvent system in which the pigment is dispersed and also in which any additives are dispersed or dissolved. A typical liquid vehicle formulation that can be used in the ink jet ink can include one or more organic co-solvent(s), present in total at from 5.0 wt % to 50.0 wt %, and one or more non-ionic, cationic, and/or anionic surfactant(s), present from 0.01 wt % to 5.0 wt %. The balance of the formulation can be water, or other vehicle components such as biocides, viscosity modifiers, pH adjusting agents, sequestering agents, preservatives, anti-kogation agents, bleed control agents, drying agents, jettability agents, and the like.

Classes of co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, 1,6-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include 2-pyrrolidone, derivatized 2-pyrrolidone including 1-(2-hydroxyethyl)-2-pyrrolidone, 2-methyl-1,3-propanediol, 1,5-pentanediol, triethylene glycol, diethylene glycol, tetraethylene glycol, and ethylhydroxypropanediol (EHPD), to name a few. In one aspect, co-solvents can be selected that are not strong solvents of particular solids present in the ink. In one example, the liquid vehicle includes one or more co-solvents that are not strong solvents for the dispersant used to disperse the high structure pigment particles. In such a formulation, there can be reduced loss of coverage of the pigment particles by a dispersant, particularly a dispersant that is physically adsorbed onto the particle surface.

One or more of many surfactants can also be included in the ink jet ink as recognized by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, fluoro surfactants, and the like. Specific examples of preferred surfactants for use include surfactants available under the names SURFYNOL, SOLSPERSE, TERGITOL, DOWFAX, and the like. The amount of surfactant added to the formulation, if included, may range from 0.01 wt % to 5.0 wt %.

Consistent with the formulation of this invention, various other additives may be employed to optimize the properties of the ink composition for specific applications. Examples of these additives are those added to inhibit the growth of harmful microorganisms. These additives may be biocides, fungicides, and other anti-microbial agents, which are routinely used in ink formulations. Examples of suitable microbial agents include, but are not limited to, NUOSEPT, UCARCIDE, VANCIDE, PROXEL, and combinations thereof.

Sequestering agents, such as EDTA (ethylenediaminetetraacetic acid), may be included to eliminate the deleterious effects of metal impurities. Such sequestering agents, if present, typically comprise from 0.01 wt % to 2 wt % of the ink jet ink compositions. Viscosity modifiers may also be present, as well as other additives suitable to modify properties of the ink as desired. Such additives, if present, can be in the ink jet ink compositions at from 0.01 wt % to 20 wt %.

Various buffering agents or pH adjusting agents can also be used in the ink jet ink compositions of the present invention. Typical pH adjusting agents include such pH control solutions as hydroxides of alkali metals and amines, such as lithium hydroxide, sodium hydroxide, potassium hydroxide; citric acid; amines such as triethanolamine, diethanolamine, and dimethyl-ethanolamine; nitric acid; hydrochloric acid; and other basic or acidic components. If used, pH adjusting agents typically comprise less than about 10 wt % of the ink jet ink composition. Similarly, buffering agents can be used such as, but not limited to, TRIS, MOPS, citric acid, acetic acid, MES, etc. If used, buffering agents typically comprise less than about 3 wt % of the ink jet ink composition and generally from about 0.01 wt % to 2 wt %, most commonly from 0.2 wt % to 0.5 wt %. Additionally, anti-kogation agents that can be used include lithium phosphate, sodium phosphate, phosphate esters of fatty alcohol alkoxylates, and the like, in amounts from about 0.01 wt % to 5 wt %.

In one embodiment, a method of assembling an ink jet printing system can comprise preparing an ink jet drop generator comprising a reservoir, an ink jet print nozzle in fluid communication with the reservoir, and a heating resistor for heating the ink so as to eject a drop of the ink from the nozzle. An additional step can include filling the reservoir with an ink jet ink comprising a liquid vehicle, high structure pigment particles dispersed in the liquid vehicle, and a polyurethane binder. The ink jet ink can be formulated such that when a minimum of 600 million drops of the ink jet ink composition is generated by a heating resistor of an ink jet drop generator, the heating resistor will not fail. In further detail, the reservoir can be an ink chamber packaged with the resistor and any drive circuitry in a cartridge. In one example, the reservoir can be a separate ink supply in which most of the ink is contained and where fluid communication with the resistor is provided by tubes or other such conduits.

According to this embodiment, such a method can further comprise filling the reservoir with an ink jet ink comprising a liquid vehicle, high structure pigment particles dispersed in the liquid vehicle, and a polyurethane binder. For example, printing with the ink can result in less etching or other wear on the resistor surface over repeated heating cycles. In an embodiment, utilizing an ink jet ink comprising high structure pigment particles and a polyurethane binder in a liquid vehicle can extend resistor life in ink jet printing nozzles to at least 500 MDPN. In a more particular embodiment, the resistor life is from about 600 MDPN to about 2000 MDPN (i.e. about 2 billion drops per nozzle). In another aspect, the service life of a resistor in an ink jet pen for ejection of an ink in accordance with the present embodiments is increased by at least 600 MDPN. In still another aspect, polymer dispersed high structure pigment inks in accordance with the present embodiments provide significantly improved resistor life in comparison with inks having similarly dispersed low structure pigments.

EXAMPLES

Example 1

Ink Jet Ink Compositions

Table 1 provides the ink formulation used to make a pigmented ink jet ink composition in accordance with an embodiment of the present disclosure.

TABLE 1

| Vehicle Component | Amounts (wt %) |
| --- | --- |
| Heterocyclic solvent | 3-11 |
| Buffer | 0.5-1 |
| Non-ionic surfactant | 0.1-0.5 |
| Fluoro surfactant | 0.01-0.2 |
| Biocide | 0.01-0.2 |
| Polyurethane resin | 0.1-2.5 |
| Glycol | 1-5 |
| Carbon black pigment dispersed with styrene and acrylic acid copolymers | 0.5-5 |
| Water | balance |

Example 2

Effects of Ink Formulation on Resistor Life (4 ng Pens)

Three comparative black inks (CBIs) were prepared using similar ink formulations as set forth in Table 1, with the exception of the binder used and the particle structure of the pigment. Particularly, in two inks (CBI 1 and CBI 3), 0.2 wt % to 2.0 wt % styrene acrylic was included as a binder in the place of polyurethane. Also, two inks (CBI 1 and CBI 2) included a carbon black pigment with low structure particles. The four inks (three comparative inks and Example 1 ink) were each loaded into the reservoir of a 4 ng ink jet pen and printed until resistor failure, and the total number of drops ejected per nozzle was noted.

Table 2 shows the unexpected result that the combination of high structure pigment and a polyurethane binder provided significant increase in resistor life.

TABLE 2

| Ink | Carbon Structure | Particle Size (nm) | Binder | Resistor Life in 4 ng pen (MDPN) |
| --- | --- | --- | --- | --- |
| CBI 1 | Low | 50 | Styrene acrylic | 500 |
| CBI 2 | Low | 50 | Polyurethane | 600 |
| CBI 3 | High | 100 | Styrene acrylic | 600 |
| Example Ink 1 | High | 100 | Polyurethane | >1500 |

Figure 2:
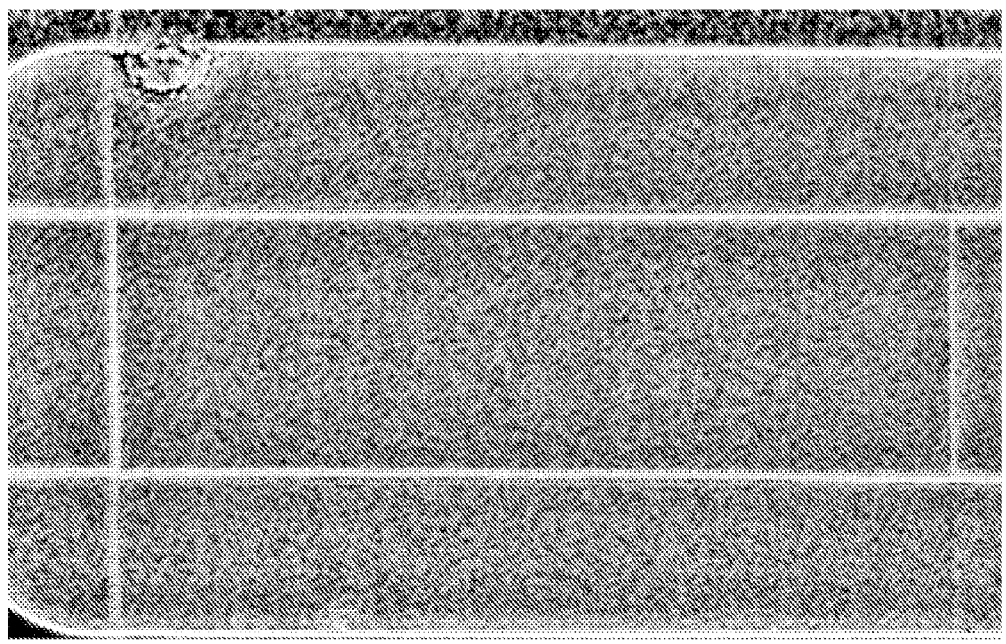
FIG. 2 is a scanning electron micrograph of the surface of an ink jet heating resistor after ejection of 1.5 billion drops of a pigment ink in accordance with an embodiment of the technology disclosed herein.

Etching of the resistor surface was greatly reduced with the Example 1 ink, even after generating 1.5 billion drops, as shown in the micrograph of FIG. 2.

Example 3

Effects of Ink Formulation on Resistor Life (9 ng Pens)

To evaluate the effects on service life in high ink usage ink jet pens, the ink jet ink from Example 1 and two web press inks were each loaded into the reservoir of a 9 ng ink jet pen and printed until resistor failure, and the total number of drops ejected per nozzle was noted. For comparison, the low structure pigment ink CBI 1 was also tested.

As can be seen from the results shown in Table 3, resistor life in higher volume drop ejection suffers from use of low structure polymer-dispersed pigment ink. However, the combination of polyurethane binder with high structure polymer-dispersed ink results in greatly increased resistor life.

TABLE 3

| Ink | Carbon Structure | Binder | Resistor Life in 9 ng pen (MDPN) |
| --- | --- | --- | --- |
| CBI 1 | Low | Styrene acrylic | 200 |
| Example Ink 1 | High | Polyurethane | 800 |
| Web Press 1 | High | Polyurethane | 1270 |
| Web Press 2 | High | Polyurethane | >1500 |

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

What is claimed is:

1. An ink jet ink with high structure pigment particles, comprising:
    a liquid vehicle;
    high structure pigment particles dispersed in the liquid vehicle at from about 0.2 wt % to about 5.0 wt %, the high structure pigment particles having:
        a polymer dispersant adsorbed onto a surface thereof,
        a DBP absorption value at a minimum of about 75 ml/100 g, and
        a surface area of about 200 m$^2$/g to about 2000 m$^2$/g; and
    a polyurethane binder present in the liquid vehicle at from about 0.2 wt % to about 5.0 wt %.

2. The composition of claim 1, wherein the high structure pigment particles exhibit a DBP absorption value of from about 75 ml/100 g to about 400 ml/100 g.

3. The composition of claim 1, wherein the high structure pigment particles have a secondary particle size of from about 50 nm to about 500 nm.

4. The composition of claim 1, wherein the polyurethane binder comprises a copolymer including diisocyanate, dimethylolpropionic acid, or polytetramethylene glycol.

5. The composition of claim 1, wherein the polymer dispersant is a copolymer including polymerized monomers of styrene, methacrylic acid, acrylic acid, substituted acrylic or methacrylic acid, or maleic anhydride.

6. The composition of claim 1, wherein the high structure pigment particles are carbon black.

7. The composition of claim 1, wherein the ink jet ink is capable of being printed in an amount of at least 600 million drops from an ink jet drop generator without resistor failure, wherein the ink jet drop generator comprises a heating resistor generating the drops of the ink jet ink.

8. The composition of claim 1, wherein the high structure pigment particles have a DBP absorption value greater than 100 ml/100 g up to about 400 ml/100 g.

9. The composition of claim 1, wherein the ink jet ink is capable of being printed in an amount of at least 1500 million drops from a 4 nanogram ink jet drop generator without resistor failure, wherein the ink jet drop generator comprises a heating resistor generating the drops of the ink jet ink.

10. The composition of claim 1, wherein the ink jet ink is capable of being printed in an amount of at least 800 million drops from a 9 nanogram ink jet drop generator without resistor failure, wherein the ink jet drop generator comprises a heating resistor generating the drops of the ink jet ink.

11. An ink jet printing device, comprising:
a reservoir containing an ink jet ink comprising a liquid vehicle, from about 0.2 wt % to about 5.0 wt % high structure pigment particles dispersed in the liquid vehicle, and from about 0.5 wt % to about 5.0 wt % of a polyurethane binder, the high structure pigment particles, having:
a polymer dispersant adsorbed onto a surface thereof,
a DBP absorption value at a minimum of about 75 ml/100 g, and
a surface area of about 200 $m^2/g$ to about 2000 $m^2/g$;
a nozzle in fluid communication with the reservoir; and
a heating resistor for heating the ink so as to eject a drop of the ink from the nozzle.

12. The device of claim 11, wherein the high structure pigment particles comprise carbon black pigment particles.

13. The device of claim 11, wherein the high structure pigment particles exhibit a DBP absorption value of from about 75 ml/100 g to about 400 ml/100 g.

14. The device of claim 11, wherein the high structure pigment particles have a secondary particle size of from about 50 nm to about 500 nm.

15. The device of claim 11, wherein the polyurethane binder comprises a copolymer including diisocyanate, dimethylolpropionic acid, or polytetramethylene glycol.

16. The device of claim 11, wherein the nozzle has a diameter for producing a drop size of about 4 ng to about 9 ng.

17. A method of assembling an ink jet printing system, comprising:
preparing an ink jet drop generator comprising a reservoir, an ink jet print nozzle in fluid communication with the reservoir, and a heating resistor for heating the ink so as to eject a drop of the ink from the nozzle; and
filling the reservoir with an ink jet ink comprising a liquid vehicle, from about 0.2 wt % to about 5.0 wt % high structure pigment particles dispersed in the liquid vehicle, and from about 0.5 wt % to about 5.0 wt % of a polyurethane binder, the high structure pigment particles having:
a polymer dispersant adsorbed onto a surface thereof,
a DBP absorption value at a minimum of about 75 ml/100 g, and
a surface area of about 200 $m^2/g$ to about 2000 $m^2/g$.

18. An ink jet ink with high structure pigment particles, comprising:
a liquid vehicle;
high structure pigment particles dispersed in the liquid vehicle at from about 0.2 wt % to about 5.0 wt %, the high structure pigment particles having:
a polymer dispersant adsorbed onto a surface thereof,
a DBP absorption value greater than 100 ml/100 g up to about 400 ml/100 g, and
a surface area of about 200 $m^2/g$ to about 2000 $m^2/g$; and
a polyurethane binder present in the liquid vehicle at from about 0.2 wt % to about 5.0 wt %.

* * * * *